US012478918B1

(12) United States Patent
Chen et al.

(10) Patent No.: US 12,478,918 B1
(45) Date of Patent: Nov. 25, 2025

(54) SYSTEMS FOR REMOVING CARBON DIOXIDE FROM A CARBON DIOXIDE CONTAINING GAS, AND RELATED METHODS

(71) Applicant: Schlumberger Technology Corporation, Sugar Land, TX (US)

(72) Inventors: Yiyan Chen, Houston, TX (US); Z. Frank Zheng, Sugar Land, TX (US); Keyur Pandya, Sugar Land, TX (US); Yang He, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/954,659

(22) Filed: Nov. 21, 2024

(51) Int. Cl.
| | | |
|---|---|---|
| *B01D 53/14* | (2006.01) | |
| *B01D 21/26* | (2006.01) | |
| *B01D 53/18* | (2006.01) | |
| *B01D 53/62* | (2006.01) | |
| *B01D 53/78* | (2006.01) | |

(52) U.S. Cl.
CPC ....... *B01D 53/1475* (2013.01); *B01D 21/267* (2013.01); *B01D 53/1493* (2013.01); *B01D 53/18* (2013.01); *B01D 53/62* (2013.01); *B01D 53/78* (2013.01); *B01D 2252/20405* (2013.01); *B01D 2252/20426* (2013.01); *B01D 2257/504* (2013.01)

(58) Field of Classification Search
CPC ............ B01D 53/1475; B01D 53/1493; B01D 53/18; B01D 53/62; B01D 53/78; B01D 21/267; B01D 2252/20405; B01D 2252/20426; B01D 2257/504
USPC ......................................................... 423/228
See application file for complete search history.

(56) References Cited

U.S. PATENT DOCUMENTS

| | | | |
|---|---|---|---|
| 2014/0026752 A1* | 1/2014 | Wang ................. | B01D 53/1475 95/185 |
| 2014/0150652 A1* | 6/2014 | Bedell ................ | B01D 53/1475 96/242 |

* cited by examiner

*Primary Examiner* — Anita Nassiri-Motlagh
(74) *Attorney, Agent, or Firm* — Jeffrey D. Frantz (57) ABSTRACT

A system for recovering carbon dioxide from a carbon dioxide-containing gas includes an absorber configured to absorb carbon dioxide from the carbon dioxide-containing gas with a non-aqueous solvent to form a carbon dioxide-lean gas, the non-aqueous solvent comprising a nitrogenous base, regenerator configured to remove the carbon dioxide from the non-aqueous solvent after the non-aqueous solvent is loaded with carbon dioxide, and an acid wash column configured to remove a second portion of the nitrogenous base from the carbon dioxide-lean gas with a buffered acid solution. Related systems and methods of removing carbon dioxide from a carbon dioxide-containing gas are also disclosed.

16 Claims, 5 Drawing Sheets

SYSTEMS FOR REMOVING CARBON DIOXIDE FROM A CARBON DIOXIDE CONTAINING GAS, AND RELATED METHODS

CROSS REFERENCE TO RELATED APPLICATIONS

N/A.

BACKGROUND

Carbon dioxide ($CO_2$) emissions are a significant contributor to greenhouse gases. For example, byproducts of fossil fuel combustion include $CO_2$ and other greenhouse gas emissions. During the combustion of fossil fuels, such as in electric power plants for the generation of electricity, flue gas from a furnace, boiler, or engine is emitted through one or more stacks to the atmosphere. The flue gas includes one or more pollutants, such as carbon dioxide, and other pollutants, including sulfur oxides, nitrogen oxides, and particulate matter. Carbon dioxide is also present in natural gas or biogas generated from anaerobic digesters. The $CO_2$ is conventionally removed from such materials to increase the concentration of methane for subsequent use. In addition to $CO_2$, emissions from combustion processes may also include other gases, such as carbonyl sulfide (COS), hydrogen sulfide, sulfur oxides ($SO_x$ gases), and/or nitrogen oxides (NOx gases).

Many approaches have been developed to recover $CO_2$ and other acid gases from post-combustion gases and industrial gases. For example, some methods of capturing $CO_2$ from a flue gas include the use of an absorber in which the flue gas is absorbed by a liquid absorbent that interacts with the $CO_2$ and other acid gases in the flue gas to separate the $CO_2$ and other acid gases from the flue gas and form a $CO_2$ lean gas having a lower concentration of $CO_2$ than the flue gas. The absorbent becomes loaded (or enriched; referred to as a "loaded absorbent") with the $CO_2$ and the other acid gases. The $CO_2$ and other acid gases are subsequently removed from the loaded absorbent to form a $CO_2$-rich gas. Removal of the $CO_2$ and other acid gases from the loaded absorbent regenerates the absorbent and forms a lean absorbent having a lower concentration of absorbed $CO_2$ than the loaded absorbent. The lean absorbent is circulated back to the absorber and the process of absorbing the $CO_2$ and other acid gases from the flue gas with the absorbent is continued.

Other methods of capturing $CO_2$ from a flue gas include contacting the flue gas with a sorbent on which the $CO_2$ is physical adsorbed to form a clean gas having a lower concentration of $CO_2$ than the flue gas. After capturing the $CO_2$ with the sorbent, the sorbent is regenerated to remove the adsorbed $CO_2$ and generate a $CO_2$-rich gas. Whether the $CO_2$ is captured by a liquid absorbent or a physical sorbent, the $CO_2$-rich gas may be compressed and utilized in an industrial process and/or injected into a subterranean formation (e.g., depleted hydrocarbon reservoirs in the subterranean formation) for storage.

BRIEF SUMMARY

In some embodiments, a system for removing carbon dioxide from a carbon dioxide-containing gas comprises an absorber configured to absorb carbon dioxide from the carbon dioxide-containing gas with a non-aqueous solvent to form a carbon dioxide-lean gas, wherein the non-aqueous solvent comprises a nitrogenous base, a regenerator configured to remove the carbon dioxide from the non-aqueous solvent after the non-aqueous solvent is loaded with carbon dioxide, an acid wash column configured to remove a second portion of the nitrogenous base from the carbon dioxide-lean gas with a buffered acid solution.

In some embodiments, a system for removing carbon dioxide from a carbon dioxide-containing gas comprises an absorber configured to remove carbon dioxide from the carbon dioxide-containing gas with a non-aqueous solvent to form a carbon dioxide-lean gas having a lower concentration of carbon dioxide than the carbon dioxide-containing gas, wherein the non-aqueous solvent comprises a nitrogenous base, an acid wash column configured to remove at least some of the nitrogenous base entrained in the carbon dioxide-lean gas with an acid and form an acid washed solution including the acid and the nitrogenous base, and a cyclone separator configured to receive the acid washed solution from the acid wash column and separate the nitrogenous base from the acid washed solution.

In some embodiments, a method of removing carbon dioxide from a carbon dioxide-containing gas comprises absorbing carbon dioxide from the carbon dioxide-containing gas in an absorber with a non-aqueous solvent to form a loaded absorbent including the carbon dioxide and a carbon dioxide-lean gas including entrained nitrogenous base, wherein the non-aqueous solvent comprises a nitrogenous base. The method further comprises removing the entrained nitrogenous base in the carbon dioxide-lean gas with a buffered acid to form a clean gas having a lower concentration of the nitrogenous base than the carbon dioxide-lean gas and an acid washed solution including the buffered acid and the entrained nitrogenous base, and separating the at least some of the entrained nitrogenous base from the acid washed solution in a separator.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

This disclosure generally relates to devices, systems, and methods for reducing an amount of an absorbent (e.g., including a nitrogenous base, such as an amine) lost to the atmosphere during acid washing of a $CO_2$-lean gas including entrained absorbent. A carbon capture system for capturing $CO_2$ from a $CO_2$-containing gas (e.g., a flue gas) may include, for example, an absorber in which the $CO_2$-containing gas is contacted with an absorbent comprising a non-aqueous solvent (NAS), which may include a nitrogenous base (e.g., an amine) and an organic diluent. The NAS may absorb $CO_2$ from the $CO_2$-containing gas and form a $CO_2$-lean gas and a loaded absorbent that is rich with the $CO_2$. The carbon capture system further includes a regenerator to remove the $CO_2$ from the loaded absorbent to form a lean absorbent and a $CO_2$-rich gas. The lean absorbent may be recycled to the absorber to continuously capture the $CO_2$ in the $CO_2$-containing gas. The $CO_2$-rich gas may be utilized in industrial processes to form carbon-containing materials (e.g., ethanol, sustainable fuels, chemicals, mineral aggregates, and/or other materials) and/or may be stored, such as in a subterranean formation.

In some embodiments, at least some of the NAS becomes entrained in the $CO_2$-lean gas exiting the absorber. For example, at least some of the nitrogenous base may be vaporized and/or aerosolized in the absorber and carried out of the absorber with the $CO_2$-lean gas. If the entrained nitrogenous base is not captured in the carbon capture system, the nitrogenous base is lost to the atmosphere. However, the release of the nitrogenous base to the atmosphere may be subject to regulations. For example, the nitrogenous base may form nitrosamines and nitramines, which may be carcinogenic and/or associated with various health risks. In addition to environmental concerns, the loss of the nitrogenous base to the atmosphere results in significant losses over the course of operation of the carbon capture system, increasing the operating costs of the carbon capture system.

To reduce the amount of nitrogenous base lost to the atmosphere, the carbon capture system may include a water wash column for treating (e.g., water washing) the $CO_2$-lean gas to remove a first portion of the nitrogenous base from the $CO_2$-lean gas. However, the nitrogenous base may be hydrophobic and may be in the non-aqueous phase. Due, at least in part, to the limited solubility of the nitrogenous base in water, the water wash may not sufficiently remove all of the nitrogenous base from the $CO_2$-lean gas, and a second portion of the nitrogenous base (not captured in the first portion of the nitrogenous base) may remain in a water washed solution exiting the water wash column.

The carbon capture system may include an acid wash column configured to facilitate acid washing of the nitrogenous base from the water washed solution. The acid wash column may be configured to facilitate contact between a buffered acid (e.g., a solution of a weak acid and a salt, such as the conjugate base of the weak acid) and the water washed solution to remove substantially all of the nitrogenous base from the water washed solution and form a clean gas substantially free of $CO_2$ and the nitrogenous base. An acid washed solution exiting the acid wash column may include the nitrogenous base and the buffered acid.

The acid of the acid wash column may be buffered and substantially free of strong acids. In some embodiments, the buffered acid includes buffered citric acid. Using a buffered acid for acid washing the water washed solution rather than a strong acid and/or an unbuffered acid facilitates improved recovery of the nitrogenous base from the water washed solution compared to acid washing with a strong acid and/or without a buffered acid. For example, the buffered acid may exhibit a substantially smaller change in pH responsive to contact with the nitrogenous base compared to when the acid wash includes a strong acid. Since the pH of the buffered acid remains substantially constant, the buffered acid may facilitate neutralization (e.g., protonation) of a larger quantity of the nitrogenous base in the acid wash column compared to when the acid wash is performed with unbuffered acids and/or strong acids. Since a larger quantity of the nitrogenous base is neutralized by the buffered acid, a larger quantity of the nitrogenous base may be soluble in the aqueous phase and recovered in the acid washed solution. By way of comparison, strong acids and unbuffered acids may exhibit relatively larger changes (e.g., increases) in pH responsive to contact with the nitrogenous base, reducing the amount of the nitrogenous base that is neutralized and solubilized in the aqueous phase. Furthermore, strong acids may exhibit a low pH (e.g., a corrosive pH) at relatively low concentrations. Increasing the concentration of the strong acids may further reduce the pH of the strong acids, increasing the corrosivity of the strong acids. However, at a suitable pH for the acid wash, the acid is quickly consumed by a relatively small amount of the nitrogenous base. The buffered acid according to embodiments described herein exhibits an improved capacity for recovering the nitrogenous base and may reduce the number of times make up acid is added to the acid wash compared to conventional acids.

In addition, after the nitrogenous base is recovered in the aqueous phase of the acid washed solution, the nitrogenous base may be phase separated from the acid washed solution more easily than when using unbuffered acids and/or strong acids. For example, the nitrogenous base may separate from the aqueous phase of the acid washed solution at a relatively lower pH compared to unbuffered and/or strong acids. The separation of the nitrogenous base from the aqueous phase at a lower pH facilitates separation of the nitrogenous base from the acid washed solution while the buffered acid remains at an acidic pH.

In some embodiments, the nitrogenous base is separated from the acid washed solution with a cyclone separator. In some such embodiments, the nitrogenous base is separated from the aqueous phase of the acid washed solution (which includes the buffered acid) based on a difference in density between the nitrogenous base and the buffered acid. The nitrogenous base may be separated from the aqueous phase of the acid washed solution without the use of a stronger base than the nitrogenous base to replace the nitrogenous base in an acid-base salt including the nitrogenous base. For example, the density of the aqueous phase of the acid washed solution may be relatively higher when using the buffered acid compared to when using a strong acid. The increase in the density of the aqueous phase may increase the difference in the density of the aqueous phase and the nitrogenous base. The increase in the difference in the density may facilitate improved separation of the nitrogenous base from the aqueous phase. In other embodiments, the nitrogenous base is separated from the acid washed solution by solvent extraction using a solvent that is already used in the carbon capture system. The nitrogenous base may be separated from the acid washed solution by contacting the acid washed solution with the organic diluent already present in the NAS. Separating the nitrogenous base from the acid washed solution with the cyclone separator and/or the organic diluent reduces the use of additional chemicals for the recovery of the nitrogenous base compared to conventional methods.

Figure 1:
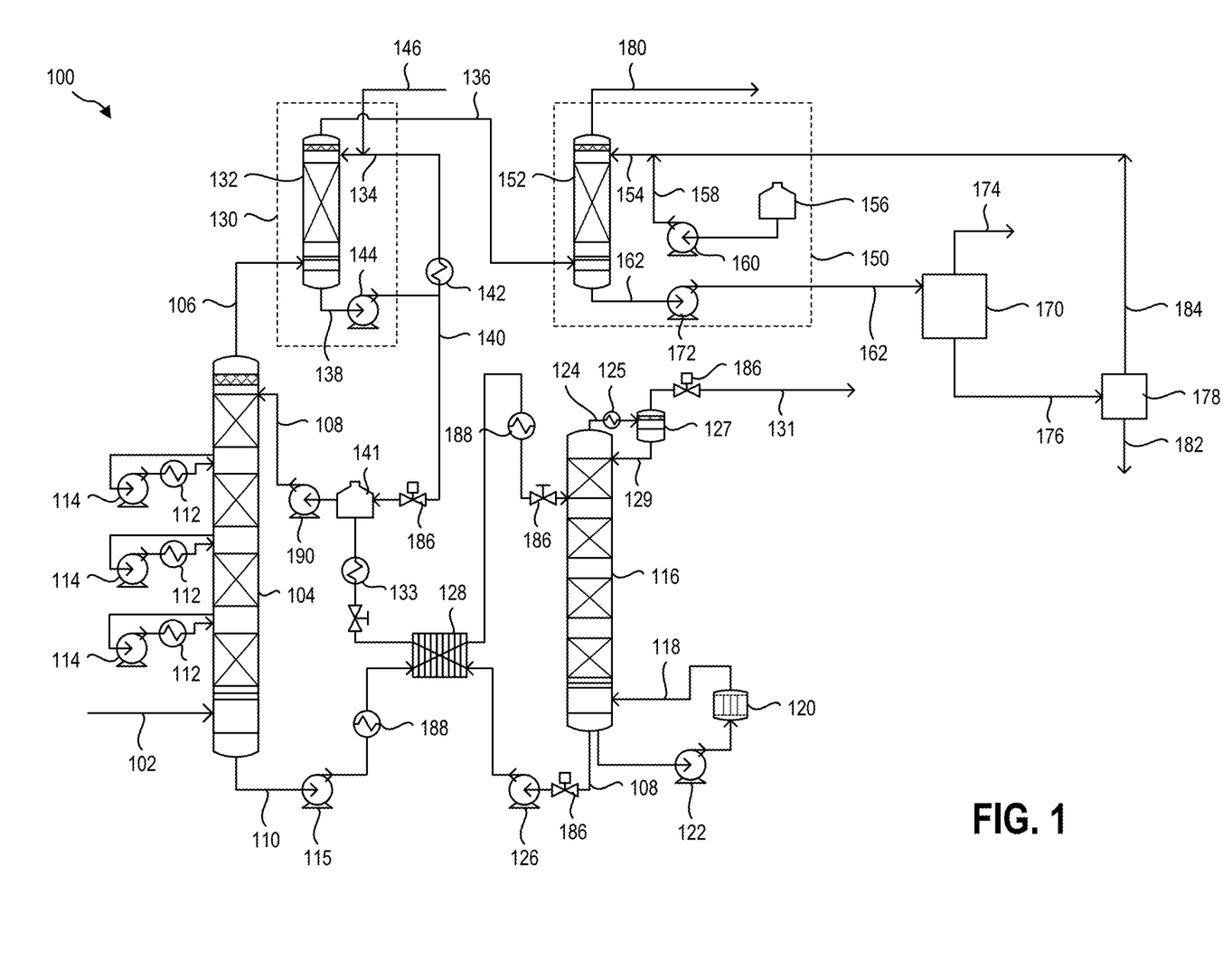
FIG. 1 is a simplified schematic illustrating a carbon capture system, according to at least one embodiment of the disclosure.

FIG. 1 is a simplified schematic illustrating a carbon capture system 100, according to at least one embodiment of the disclosure. The carbon capture system 100 is configured to remove $CO_2$ and other acid gases from a carbon dioxide-containing ($CO_2$-containing) gas 102. The $CO_2$-containing gas 102 may be a flue gas from a combustion process or another gas from an industrial process. Prior to treatment in the carbon capture system 100, the $CO_2$-containing gas 102 may be treated by one or more air pollution control devices, such as electrostatic precipitators (ESPs), flue gas desulfurization (FGD) units, selective catalytic NOx reduction (SCR) units, a scrubber, or other emission control devices to reduce the emission of particulates and other materials to the atmosphere.

The $CO_2$-containing gas 102 may be provided to an absorber 104 where the $CO_2$ in the $CO_2$-containing gas 102 may be at least partially (e.g., substantially) removed from the $CO_2$-containing gas 102 to form a carbon dioxide-lean ($CO_2$-lean) gas 106 having a lower concentration of $CO_2$ than the $CO_2$-containing gas 102. A temperature of the $CO_2$-containing gas 102 may be within a range of from about 30° C. to about 120° C., such as from about 30° C. to about 60° C., from about 60° C. to about 90° C., or from about 90° C. to about 120° C. The temperature of the $CO_2$-containing gas 102 may be controlled by, for example, passing the $CO_2$-containing gas 102 through a heat exchanger prior to introducing the $CO_2$-containing gas 102 to the absorber 104. In some embodiments, the temperature of the $CO_2$-containing gas 102 is within a range of from about 25° C. to about 40° C. In some embodiments, the absorber 104 may be configured to remove from about 85 percent to about 95 percent of the $CO_2$ from the $CO_2$-containing gas 102, such that from about 5 percent to about 15 percent of the $CO_2$ originally present in the $CO_2$-containing gas 102 remains in the $CO_2$-lean gas 106. However, depending on the operating conditions of the absorber 104, the efficiency of $CO_2$ removal from the $CO_2$-containing gas 102 may be as high as or higher than about 99 percent or even higher.

The $CO_2$-containing gas 102 may be provided to a lower portion of the absorber 104 and flow countercurrent to an absorbent (e.g., a lean absorbent 108) provided to an upper portion of the absorber 104. The lean absorbent 108 may flow downwardly (e.g., such as by gravity) through the absorber 104 countercurrent to the $CO_2$-containing gas 102. The lean absorbent 108 absorbs $CO_2$ from the $CO_2$-containing gas 102 to remove $CO_2$ from the $CO_2$-containing gas 102 and form the $CO_2$-lean gas 106. Absorption of the $CO_2$ from the $CO_2$-containing gas 102 loads the lean absorbent 108 with $CO_2$ and forms a loaded absorbent 110 (also referred to as a "$CO_2$-rich absorbent," a "loaded solvent," a "$CO_2$-rich solvent," or "a $CO_2$-loaded solvent"), which exits at a bottom of the absorber 104.

The lean absorbent 108 and the loaded absorbent 110 may each include substantially the same material composition, except that the lean absorbent 108 may include less $CO_2$ absorbed therein than the loaded absorbent 110. In some embodiments, lean absorbent 108 and the loaded absorbent 110 include a NAS. Reference to the absorbent herein refers to the NAS. The NAS may include an organic solvent system that may be partially miscible with water or immiscible with water. The NAS may include polar aprotic solvent systems, protic solvent systems, and mixtures thereof. In some embodiments, the NAS includes a nitrogenous base (e.g., an amine, such as an organic amine) and an organic diluent. In some embodiments, the NAS further includes water.

The nitrogenous base of the NAS may include an amine (e.g., a primary amine, a secondary amine), an amidine, a guanidine (e.g., 1,1,3,3-tetramethylguanidine ("TMG")), a triazole (e.g., 1,2,3-triazole, 1,2,4-triazole), or combinations thereof. In some embodiments, the nitrogenous base includes a hydrophobic amine. The amine may include one or more of N-methylbenzylamine (NMBA), 2-fluoro-N-methylbenzylamine, 3-fluoro-N-methylbenzylamine, 4-fluoro-N-methylbenzylamine, 3,5-difluorobenzylamine, 1,4-diazabicyclo-undec-7-ene ("DBU"), 1,4-diazabicyclo-2,2,2-octane, piperazine ("PZ"), triethylamine ("TEA"), 1,8-diazabicycloundec-7-ene, monoethanolamine ("MBA"), diethyl amine ("DEA"), ethylenediamine ("EDA"), methyldiethanolamine (MDEA), 2-amino 1-propanol (AMP), 1,3-diamino propane, 1,4-diaminobutane, hexamethylenediamine, 1,7-diaminoheptane, diethanolamine, diisopropylamine ("DIPA"), 4-aminopyridine, pentylamine, hexylamine, heptylamine, octylamine, nonyl amine, decylamine, tert-octylamine, dioctylamine, dihexylamine, 2-ethyl-1-hexylamine, 2-fluorophenethylamine, 3-fluorophenethylamine, 4-fluorophenethylamine, D-4-fluoro-alpha-methylbenzylamine, L-4-fluoro-alpha-methylbenzylamine, imidazole, benzimidazole, N-methyl imidazole, 1-trifluoroacetylimidazole, or combinations thereof. In some embodiments, the hydrophobic amine includes N-methyl-benzylamine.

The organic diluent may include a polyether diluent and may be selected from the group consisting of alcohols, ketones, aliphatic hydrocarbons, aromatic hydrocarbons, nitrogen heterocycles, oxygen heterocycles, aliphatic ethers, cyclic ethers, esters, and amides and mixtures thereof. In some embodiments, the organic diluent includes a polyether diluent, such as a polyethylene glycol dialkyl ether. By way of non-limiting example, the organic diluent may include a polyglycol dimethyl ether, a polyglycol dibutyl ether, or a combination thereof. In some embodiments, the organic diluent includes diethylene glycol dibutyl ether, triethylene glycol dibutyl ether, tetraethylene glycol dibutyl ether, or combinations thereof. In some embodiments, the organic diluent includes triethylene glycol dibutyl ether. In some embodiments, the organic diluent includes a polyethylene glycol dialkyl ether, such as Genosorb® 1843, commercially available from Clariant of Muttenz, Switzerland. The organic diluent may be formulated and configured to remove at least some of the acid gases (e.g., $CO_2$) in the $CO_2$-containing gas 102 by directly contacting the $CO_2$-containing gas 102.

In some embodiments, the nitrogenous base includes NMBA and the organic diluent includes one or more polyethylene glycol dialkyl ethers. In some such embodiments, the NAS includes NMBA and one or more polyethylene glycol dialkyl ethers, such as one or more of diethylene glycol dibutyl ether, triethylene glycol dibutyl ether, or tetraethylene glycol dibutyl ether.

The NAS may include a mixture of the nitrogenous base, the organic diluent, and water. The NAS may include substantially equal proportions by molarity of the nitrogenous base and the organic diluent. In some such embodiments, the nitrogenous base and the organic diluent are present in the NAS in equimolar amounts.

In some embodiments, the NAS includes a greater weight percent of the nitrogenous base than of the organic diluent. The nitrogenous base may constitute from about 40.0 weight percent to about 70 weight percent of the NAS, such as from about 40.0 weight percent to about 50.0 weight percent, from about 50.0 weight percent to about 60.0 weight percent, or from about 60.0 weight percent to about 70.0 weight percent of the NAS. In some embodiments, the nitrogenous base constitutes from about 50.0 weight percent to about 60.0 weight percent, such as about 55.0 weight percent of the NAS.

The organic diluent may constitute from about 30.0 weight percent to about 50.0 weight percent of the NAS, such as from about 30.0 weight percent to about 35.0 weight percent, from about 35.0 weight percent to about 40.0 weight percent, from about 40.0 weight percent to about 45.0 weight percent, or from about 45.0 weight percent to about 50.0 weight percent of the NAS. In some embodiments, the organic diluent constitutes from about 35.0 weight percent to about 40.0 weight percent, such as about 37.0 weight percent of the NAS.

Water may constitute from about 2.5 weight percent to about 12.5 weight percent of the NAS, such as from about 2.5 weight percent to about 3.0 weight percent, from about 3.0 weight percent to about 4.0 weight percent, from about 4.0 weight percent to about 5.0 weight percent, from about 5.0 weight percent to about 6.0 weight percent, from about 6.0 weight percent to about 7.0 weight percent, from about 7.0 weight percent to about 8.0 weight percent, from about 8.0 weight percent to about 9.0 weight percent, from about 9.0 weight percent to about 10.0 weight percent, from about 10.0 weight percent to about 11.0 weight percent, or from about 11.0 weight percent to about 12.5 weight percent of the NAS. In some embodiments, water constitutes from about 7.0 weight percent to about 8.0 weight percent of the NAS. However, the disclosure is not so limited, and the weight percent of the water in the NAS may be different than that described. In some embodiments, the NAS includes about 55 weight percent of the nitrogenous base, about 37 weight percent of the organic diluent, and about 8 weight percent of water.

The NAS may have a density within a range of from about 0.90 g/cm3 to about 0.98 g/cm$^3$, such as from about 0.90 g/cm3 to about 0.92 g/cm$^3$, from about 0.92 g/cm3 to about 0.94 g/cm$^3$, from about 0.94 g/cm3 to about 0.96 g/cm$^3$, or from about 0.96 g/cm3 to about 0.98 g/cm$^3$. In some embodiments, the density of the NAS is about 0.94 g/cm$^3$.

The absorber 104 may be configured to provide sufficient contact between the $CO_2$-containing gas 102 and the lean absorbent 108 to facilitate absorption of $CO_2$ and other acid gases present in the $CO_2$-containing gas 102 by the lean absorbent 108 to form the $CO_2$-lean gas 106. Contacting the lean absorbent 108 with the $CO_2$-containing gas loads the lean absorbent 108 with the $CO_2$ to form the loaded absorbent 110. The absorber 104 may include a packed bed including one or more packing materials. The packing materials may include, for example, stainless steel, structured packing materials, Pall rings, rings of steel or aluminum, other packing materials, or combinations thereof. In some embodiments, the absorber 104 includes trays (e.g., sieve trays, valve trays) through which the lean absorbent 108 falls via gravity as the gas passes upwardly through the trays while contacting the lean absorbent 108.

The absorber 104 may further include or be operably coupled to one or more interstage coolers 112 configured to cool the NAS as the NAS flows downwardly through the absorber 104. Cooling the NAS may increase the $CO_2$ capacity of the NAS and facilitate improved capture of $CO_2$ from the $CO_2$-containing gas 102 by the NAS. The interstage coolers 112 may cool the NAS using water, for example. The NAS may be provided to the interstage coolers 112 by means of a pump 114.

With reference to FIG. 1, the loaded absorbent 110 may be provided to a regenerator 116 (also referred to as a "regenerator column") via a pump 115. The regenerator 116 is configured to remove the $CO_2$ and other acid gases from the loaded absorbent 110 and form the lean absorbent 108 that is provided to (e.g., recycled to, circulated to) the absorber 104. Thus, the regenerator 116 facilitates removal of $CO_2$ and other acid gases from the loaded absorbent 110 to form the lean absorbent 108. Accordingly, the NAS may be circulated through the carbon capture system 100 to capture $CO_2$ in the absorber 104, followed by release of the absorbed $CO_2$ in the regenerator 116 and recycling of the NAS to the absorber 104 to continue the process of capturing the $CO_2$ from the $CO_2$-containing gas 102.

The loaded absorbent 110 may be provided to an upper section of the regenerator 116 and flow downwardly in the regenerator 116. A stream 118 including water vapor and $CO_2$ may be provided to a lower portion of the regenerator 116 and flow upwardly through the regenerator 116 to contact the downwardly flowing loaded absorbent 110 and remove the $CO_2$ and other acid gases from the loaded absorbent 110 and form the lean absorbent 108. Thus, the stream 118 may flow countercurrent to the loaded absorbent 110 in the regenerator 116. A portion of the lean absorbent 108 exiting the bottom of the regenerator 116 may be provided to a reboiler 120 by means of a pump 122. The reboiler 120 heats the portion of the lean absorbent 108 to generate the stream 118 provided to the regenerator 116. The stream 118 may further include volatilized NAS. In some embodiments, the reboiler 120 heats the lean absorbent 108 to a temperature within a range of from about 110° C. to about 130° C.

As described above with reference to the absorber 104, the regenerator 116 may include a packed bed including one or more packing materials such as, for example, stainless steel, structured packing materials, Pall rings, rings of steel or aluminum, other packing materials, or combinations thereof. In some embodiments, the regenerator 116 includes trays (e.g., sieve trays, valve trays) through which the absorbent falls via gravity as the stream 118 passes upwardly through the trays while contacting the $CO_2$-rich absorbent 110.

With continued reference to FIG. 1, regenerating the NAS in the regenerator 116 releases the $CO_2$ from the loaded absorbent 110 and forms a $CO_2$-rich gas 124 that exits the top of the regenerator 116. In some embodiments, vapors entrained in the $CO_2$-rich gas 124 are condensed in a cooler 125 and collected in vessel (e.g., a decanter) 127. A reflux 129 including a liquid comprising the condensed vapors may be recycled to the regenerator 116. In some embodiments, the reflux 129 includes water. Vapors from the vessel 127 include a $CO_2$ product 131 from which water and other liquids have been removed.

The $CO_2$ product 131 may be further processed to remove any impurities (e.g., absorbent, steam) from the $CO_2$ product 131. The $CO_2$ product 131 may be stored in an earth formation (e.g., sequestered), may be used in the manufacture of other materials (e.g., ethanol, sustainable aviation fuel, chemicals, mineral aggregates, and/or other materials), or combinations thereof.

After leaving the bottom of the regenerator 116, the lean absorbent 108 may be provided to the absorber 104. In some embodiments, a pump 126 pumps the lean absorbent 108 to a heat exchanger 128 configured to heat the loaded absorbent 110 from the bottom of the absorber 104 with the lean absorbent 108 from the bottom of the regenerator 116 and cool the lean absorbent 108 entering the absorber 104. In some embodiments, the lean absorbent 108 may be further cooled in a cooler 133 to lower a temperature of the lean absorbent 108 and increase a $CO_2$ capacity of the lean absorbent 108 in the absorber 104. In some embodiments, the cooler 133 is substantially the same as the interstage coolers 112.

In some embodiments, at least some of the NAS from the lean absorbent 108 may be entrained in the $CO_2$-lean gas 106 exiting the absorber 104. For example, at least a portion of the NAS may be vaporized and/or aerosolized and exit the absorber 104 with the $CO_2$-lean gas 106. In some embodiments, at least a portion of the nitrogenous base of the NAS may exit the absorber 104 in the $CO_2$-lean gas 106. By way of non-limiting example, in some embodiments, the $CO_2$-lean gas 106 may include from about 20 ppm to about 3,000 ppm of the nitrogenous base (e.g., the amine). In some embodiments, the $CO_2$-lean gas 106 includes more than about 100 ppm, such as more than about 200 ppm, more than about 500 ppm, or more than about 1,000 ppm of the nitrogenous base. The $CO_2$-lean gas 106 may not include any or a significant amount of the organic diluent since the organic diluent may exhibit a vapor pressure lower than a vapor pressure of the nitrogenous base.

The carbon capture system 100 may include a water wash section 130 (illustrated in dashed box) and an acid wash section 150 (illustrated in dashed box) configured to facilitate recovery of the nitrogenous base from the $CO_2$-lean gas 106 to reduce (e.g., minimize, eliminate) loss of the nitrogenous base from the carbon capture system 100 and release thereof to the atmosphere.

The water wash section 130 may be configured to remove a first portion of (e.g., at least some of) the entrained nitrogenous base from the $CO_2$-lean gas 106. In some embodiments, the water wash section 130 includes a water wash column 132 configured to remove a first portion of the nitrogenous base from the $CO_2$-lean gas 106 to reduce losses of the nitrogenous base from the carbon capture system 100. For example, a water wash solution 134 may be provided to the water wash column 132 and flow downwardly and countercurrent to the upwardly flowing $CO_2$-lean gas 106. The water wash solution 134 may include water. The water wash solution 134 may contact the $CO_2$-lean gas 106 in the water wash column 132 and capture a first portion of the entrained nitrogenous base from the $CO_2$-lean gas 106. A water washed gas 136 having a lower concentration of the nitrogenous base than the $CO_2$-lean gas 106 may exit the top of the water wash column 132, and a water washed solution 138 including some of the captured nitrogenous base (the first portion of the nitrogenous base) may exit the bottom of the water wash column 132. The water washed solution 138 may include the solution of the water wash solution 134 (e.g., water) and the first portion of the nitrogenous base that is captured by the water wash solution 134. In some embodiments, a concentration of the nitrogenous base in the water washed gas 136 is within a range of from about 50 ppm to about 100 ppm, such as from about 50 ppm to about 75 ppm, or from about 75 ppm to about 100 ppm. In some embodiments, the concentration of the nitrogenous base in the water washed gas 136 is greater than about 50 ppm.

A water wash return 140 including a portion of the water washed solution 138 may be returned to the absorber 104. Another portion of the water washed solution 138 may be returned to the water wash column 132. In some embodiments, the water wash return 140 is provided to a mixing tank 141 (or a mixer) where the water wash return 140 is mixed with the lean absorbent 108 from the regenerator 116 prior to returning to the absorber 104.

In some embodiments, the water washed solution 138 and is cooled in a cooler 142, which may facilitate improved recovery of nitrogenous base from the $CO_2$-lean gas 106 in the water wash column 132, such as by improved condensation of the nitrogenous base in the water wash column 132. The cooler 142 may be substantially the same as the cooler 133. In some embodiments, make-up water 146 may be added to the water wash section 130. The water washed solution 138 and make-up water 146 may be pumped with a water wash pump 144.

The water wash column 132 may include a packed bed to facilitate increased contact between the $CO_2$-lean gas 106 and the water wash solution 134. The packed bed may include one or more packing materials, such as one or more of stainless steel, structured packing materials, Pall rings, rings of steel or aluminum, other packing materials, or combinations thereof.

While FIG. 1 illustrates that the water wash section 130 includes a single water wash column 132, the disclosure is not so limited. In other embodiments, the water wash section 130 includes more than one water wash columns 132, which may be arranged in series with respect to each other.

In some embodiments the water wash column 132 is insufficient to substantially completely remove the nitrogenous base from the $CO_2$-lean gas 106 and the water washed gas 136 includes at least some of the nitrogenous base, such as a second portion of the nitrogenous base that is not captured by the water wash column 132 in the water washed solution 138. The water washed gas 136 may include greater than about 30 ppm of the nitrogenous base. In some embodiments, the water washed gas 136 includes greater than about 30 ppm of the nitrogenous base. The acid wash section 150 may be configured to remove the nitrogenous base from the water washed gas 136 and form a cleaned gas 180 (also referred to as a "treated gas") substantially free of the nitrogenous base. The cleaned gas 180 may have a lower concentration of $CO_2$ than the $CO_2$-containing gas 102 and may be released (vented) to the atmosphere. The cleaned gas 180 may include substantially the same composition as the water washed gas 136, except that the cleaned gas 180 may include a lower concentration of the nitrogenous base than the water washed gas 136.

The acid wash section 150 may include an acid wash column 152 configured to facilitate contact between the water washed gas 136 from the water wash column 132 and a buffered acid solution 154. The water washed gas 136 may flow countercurrent to the buffered acid solution 154 in the acid wash column 152. The buffered acid solution 154 may be provided to an upper portion of the acid wash column 152 and flow downwardly and countercurrent to the upwardly flowing water washed gas 136. In some embodiments, the acid wash section 150 further includes a buffered acid tank 156 configured to provide make-up buffered acid 158 to the acid wash column 152 via a pump 160.

The acid wash column 152 may include one or more packing materials to facilitate contact between the buffered acid solution 154 and the water washed gas 136, as described above with reference to the water wash column 132. As the buffered acid solution 154 contacts the water washed gas 136 in the acid wash column 152, the buffered acid solution 154 neutralizes (e.g., protonates, forms an ammonium salt) the nitrogenous base in the water washed gas 136 to form an acid washed solution 162 including the buffered acid and neutralized nitrogenous base (e.g., neutralized amine). As used herein, neutralization of the nitrogenous base means and includes formation of a salt of the nitrogenous base, wherein the nitrogenous base is protonated. For example, a neutralized nitrogenous base may include a protonated nitrogenous base and a conjugate anion. Neutralization of the nitrogenous base may remove the nitrogenous base from the water washed gas 136 and form the cleaned gas 180 substantially free of the nitrogenous base. Neutralization of the nitrogenous base may increase the solubility of the nitrogenous base in the aqueous phase. In some embodiments, the neutralized nitrogenous base is soluble in the acid washed solution 162. The acid washed solution 162 may include a multicomponent solution including the buffered acid of the buffered acid solution 154 and the neutralized nitrogenous base.

The composition of the buffered acid solution 154 may facilitate neutralization of the nitrogenous base without substantially increasing the pH of the buffered acid solution 154, facilitating longer use of the buffered acid solution 154 for the reclamation of the nitrogenous base from the water washed gas 136. The buffered acid solution 154 may include a buffered acid. The buffered acid may include one or more weak acids and one or more conjugate bases of the one or more weak acids. The weak acids may include one or more organic acids, one or more acids containing one or more carboxyl groups, or combinations thereof. In some embodiments, the weak acids are multifunctional acids and may include one or more of a bifunctional acid, a trifunctional acid, a tetrafunctional acid, another multifunctional acid, or combinations thereof.

The acid of the buffered acid may include a weak acid and may include, for example, one or more of citric acid, maleic acid, tartaric acid, oxalic acid, succinic acid, malonic acid, glutaric acid, acetic acid, another acid, or combinations thereof. In some embodiments, the acid of the buffered acid solution 154 includes citric acid. In some embodiments, the acid of the buffered acid solution 154 includes a mixture of acids, such as citric acid and tartaric acid. For example, the buffered acid solution 154 may include at least one of (e.g., each of) buffered citric acid or buffered tartaric acid. Non-limiting examples of acid and conjugate base pairs of the buffered acid solution 154 include citric acid and sodium citrate; maleic acid and sodium maleate; tartaric acid and sodium tartrate; oxalic acid sodium oxalate; succinic acid and sodium succinate; malonic acid and sodium malonate; glutaric acid and a glutarate salt; and acetic acid and sodium acetate.

In some embodiments, the buffered acid solution 154 includes citric acid and sodium citrate. In some embodiments, the buffered acid solution 154 is formed by mixing citric acid with sodium citrate at a desired ratio to obtain a buffered acid solution 154 having a desired pH. In some embodiments, the buffered acid solution 154 is formed by mixing citric acid monohydrate ($C_6H_8O_7 \cdot H_2O$) with trisodium citrate dihydrate ($C_6H_5O_7Na_3 \cdot 2H_2O$) at a desired ratio to form the buffered acid solution 154 having a desired pH. In other embodiments, the buffered acid solution 154 includes buffered maleic acid including maleic acid and sodium maleate. Of course, the disclosure is not so limited, and the buffered acid solution 154 may include buffered acids other than those described.

A molar ratio of the acid to the conjugate base in the buffered acid solution 154 may depend on the desired pH of the buffered acid solution 154. The buffered acid solution 154 may include a greater molar concentration of the acid than of the conjugate base.

The buffered acid solution 154 may exhibit a pH within a range of from about 2.5 to about 3.5, such as from about 2.5 to about 3.0, or from about 3.0 to about 3.5. In some embodiments, the pH of the buffered acid solution 154 is about 3.0. Buffering of the buffered acid solution 154 may substantially reduce changes in pH of the buffered acid solution responsive to exposure to the nitrogenous base in the water washed gas 136 compared to acid washes that are not buffered. For example, responsive to exposure to the nitrogenous base in the water washed gas 136, the weak acid reacts with the nitrogenous base to neutralize the nitrogenous base without substantially changing the pH of the buffered acid solution 154.

The concentration of the buffered acid solution 154 may be within a range of from about 0.5 molar (0.5 M) to about 3.0 M, such as from about 0.5 M to about 1.0 M, from about 1.0 M to about 1.5 M, from about 1.5 M to about 2.0 M, from about 2.0 M to about 2.5 M, or from about 2.5 M to about 3.0 M. In some embodiments, the concentration of the buffered acid solution 154 is greater than about 0.5 M, such as greater than about 1.0 M, greater than about 1.5 M, greater than about 2.0 M, or greater than about 2.5 M.

The buffered acid solution 154 may exhibit a density within a range of from about 1.00 g/cm$^3$ to about 1.20 g/cm$^3$, such as from about 1.00 g/cm$^3$ to about 1.05 g/cm$^3$, from about 1.05 g/cm$^3$ to about 1.10 g/cm$^3$, from about 1.10 g/cm$^3$ to about 1.15 g/cm$^3$, or from about 1.15 g/m3 to about 1.20 g/cm$^3$. In some embodiments, the density of the buffered acid solution 154 is greater than about 1.05 g/cm$^3$, such as greater than about 1.06 g/cm$^3$, greater than about 1.10 g/cm$^3$, or greater than about 1.15 g/cm$^3$. In some embodiments, a difference in density between the buffered acid solution 154 and the nitrogenous base may be at least about 0.08 g/cm$^3$, such as at least about 0.10 g/cm$^3$, at least about 0.13 g/cm$^3$, at least about 0.15 g/cm$^3$, at least about 0.17 g/cm$^3$, at least about 0.20 g/cm$^3$, or at least about 0.22 g/cm$^3$.

The buffered acid solution 154 facilitates improved capture of the nitrogenous base from the water washed gas 136 compared to the use of an unbuffered acid or a strong acid such as sulfuric acid, as is conventionally used for acid washing. For example, conventional acid washing uses strong acids and/or unbuffered acids, such as sulfuric acid. However, to avoid corrosion of acid wash equipment, the strong acids can only be present in the acid wash at relatively low concentrations. The lower concentrations of strong acids allow only a small amount of the nitrogenous base to be neutralized before the pH of the acid wash increases to a level above which the acid no longer neutralizes the nitrogenous base (and, therefore, no longer captures the nitrogenous base), resulting in slip of the nitrogenous base. In addition, since the acid of conventional acid washes only have a small concentration of the acid to avoid corrosion, the concentration of the acid must continuously be monitored in an effort to maintain the effectiveness of the acid in neutralizing the nitrogenous base as the small concentration of acid is consumed by the nitrogenous base. However, changes in process conditions (e.g., amine slip in the $CO_2$-lean gas 106 and the water washed gas 136) may increase a difficultly of capturing the nitrogenous base with a low concentration of acid in the acid wash. By way of comparison, the buffered acid solution 154 may exhibit a higher concentration of the weak acid at a pH that does not substantially cause corrosion of the equipment of the acid wash section 150. In addition, in conventional acid wash systems, to recover the neutralized nitrogenous base that is captured by the acid wash, a base stronger than the nitrogenous base (e.g., sodium hydroxide) is added to the acid washed solution to recover the nitrogenous base and separate the neutralized base from the acid.

The use of the buffered acid solution 154 in the acid wash column 152 facilitates improved recovery of the nitrogenous base from the water washed gas 136. For example, the concentration of the acid may be related to the amount of the nitrogenous base that can be neutralized while the pH of the buffered acid remains within a desired range. The relatively higher concentration of the weak acid in the buffered acid solution 154 may facilitate neutralization of a relatively larger concentration of the nitrogenous base than when using strong acids. In addition, because the acid is buffered, the buffered acid solution 154 may resist changes to pH responsive to exposure to relatively small concentrations of the nitrogenous base in the water washed gas 136. In addition, the buffered acid may facilitate capture a greater amount of the nitrogenous base without having a corrosive pH (e.g., a pH below about 3.0, such as below about 2.7 or below about 2.5). Thus, the buffered acid solution 154 may resist changes to pH and may remain substantially constant responsive to exposure to relatively small concentrations of the nitrogenous base in the water washed gas 136. The substantially constant pH of the buffered acid facilitates the improved neutralization and recovery of the nitrogenous base in the acid washed solution 162. Further, higher concentrations of the weak acid may be used compared to the concentration of acid in conventional acid washes, allowing for a larger amount of the nitrogenous base to be removed by the buffered acid solution 154 compared to conventional acid washes.

In addition, since the buffered acid solution 154 includes electrolytes (e.g., the acid and the conjugate base, such as citric acid and citrate salts (e.g., sodium citrate)) dissolved in the aqueous phase, the solubility of the nitrogenous base in the aqueous phase may be reduced, facilitating improved separation of the nitrogenous base from the acid washed solution 162 after recovery of the nitrogenous base from the water washed gas 136. For example, in the acid washed solution 162 including the buffered acid, the neutralized nitrogenous base may separate from the aqueous phase at a lower pH than in conventional acid wash systems that use a strong acid or an unbuffered acid. By way of non-limiting example, the nitrogenous base may separate from a 0.1 M solution of buffered citric acid at a pH of about 6.0. The nitrogenous base may separate from a 0.2 M solution of buffered citric acid at a pH of about 4.12. The separation of the nitrogenous base from the acid washed solution 162 when using the buffered acid solution 154 may facilitate the recovery of the nitrogenous base from the acid washed solution 162 before the buffered acid solution 154 loses its acidity (e.g., due to neutralization responsive to exposure to the nitrogenous base). In some embodiments, the nitrogenous base may be recovered (e.g., separated) from the aqueous phase of the acid washed solution 162 without exposing the acid washed solution 162 to a base stronger than the nitrogenous base.

As described above, the acid washed solution 162 may include the nitrogenous base and the buffered acid of the buffered acid solution 154. In some embodiments, the acid washed solution 162 may be provided to a separator 170 (e.g., via a pump 172) configured to separate the nitrogenous base from the acid washed solution 162 to form a recovered nitrogenous base 174 and an acid wash return 176. The recovered nitrogenous base 174 may include the second portion of the nitrogenous base. The separator 170 may be configured to separate the nitrogenous base from the buffered acid in the acid washed solution 162 based on at least one of a difference in density between the nitrogenous base or a difference in solubility of the nitrogen base and the buffered acid in a solvent. In some embodiments, the separator 170 includes a cyclone separator, as described with reference to FIG. 2. In other embodiments, the separator 170 includes a solvent extraction separator, as described with reference to FIG. 3.

The recovered nitrogenous base 174 may include an organic phase and the acid wash return 176 may include an aqueous phase. The recovered nitrogenous base 174 may include the nitrogenous base. In some embodiments, the recovered nitrogenous base 174 includes other components of the NAS that may have been entrained in the $CO_2$-lean gas 106. In some embodiments, as described in additional detail herein, depending on the type of separator 170, the recovered nitrogenous base 174 may include one or more solvents in which the nitrogenous base is dissolved. The acid wash return 176 may include an aqueous phase including the buffered acid and a lower concentration of the nitrogenous base than the acid washed solution 162. The recovered nitrogenous base 174 may be returned to another portion of the carbon capture system 100, such as to the absorber 104 or to the regenerator 116.

In some embodiments, the acid wash return 176 may be treated to remove acid-base salts therefrom. By way of non-limiting example, acid-base salts may be removed from the acid wash return 176 in a solids separator 178 configured to separate precipitates (e.g., amino acid, carbamate, and bicarbonate) and other solids from the acid wash return 176. In some embodiments, the solids separator 178 includes a filter or a centrifuge. Solids 182 may be removed from the solids separator 178 and a buffered acid solution recycle 184 may be recycled to the buffered acid solution 154. The buffered acid solution recycle 184 may be mixed with make-up buffered acid 158 to form the buffered acid solution 154.

Although not specifically described, the carbon capture system 100 may include piping configured to facilitate the transport of one or more of the materials described herein within the carbon capture system 100. In addition, the carbon capture system 100 may include valves 186, pumps 190, heat exchanges, heaters 188, coolers (e.g., interstage coolers 112, cooler 125, cooler 133), reboilers (e.g., reboiler 120), condensers (such as cooler 125), and/or additional process equipment to facilitate operation of the carbon capture system 100.

While the carbon capture system 100 has been described and illustrated as including the water wash section 130 and the acid wash section 150 for removing the entrained nitrogenous base from the $CO_2$-lean gas 106 (such as the respective first portion of the entrained nitrogenous base in the water wash section 130 and the second portion of the entrained nitrogenous base in the acid wash section 150), the disclosure is not so limited. In some embodiments, the $CO_2$-lean gas 106 is provided to the acid wash section 150 directly from the absorber 104 (e.g., without an intervening water wash). In some embodiments, use of the buffered acid facilitates removing the nitrogenous base from the $CO_2$-lean gas 106 without using a water wash.

Figure 2:
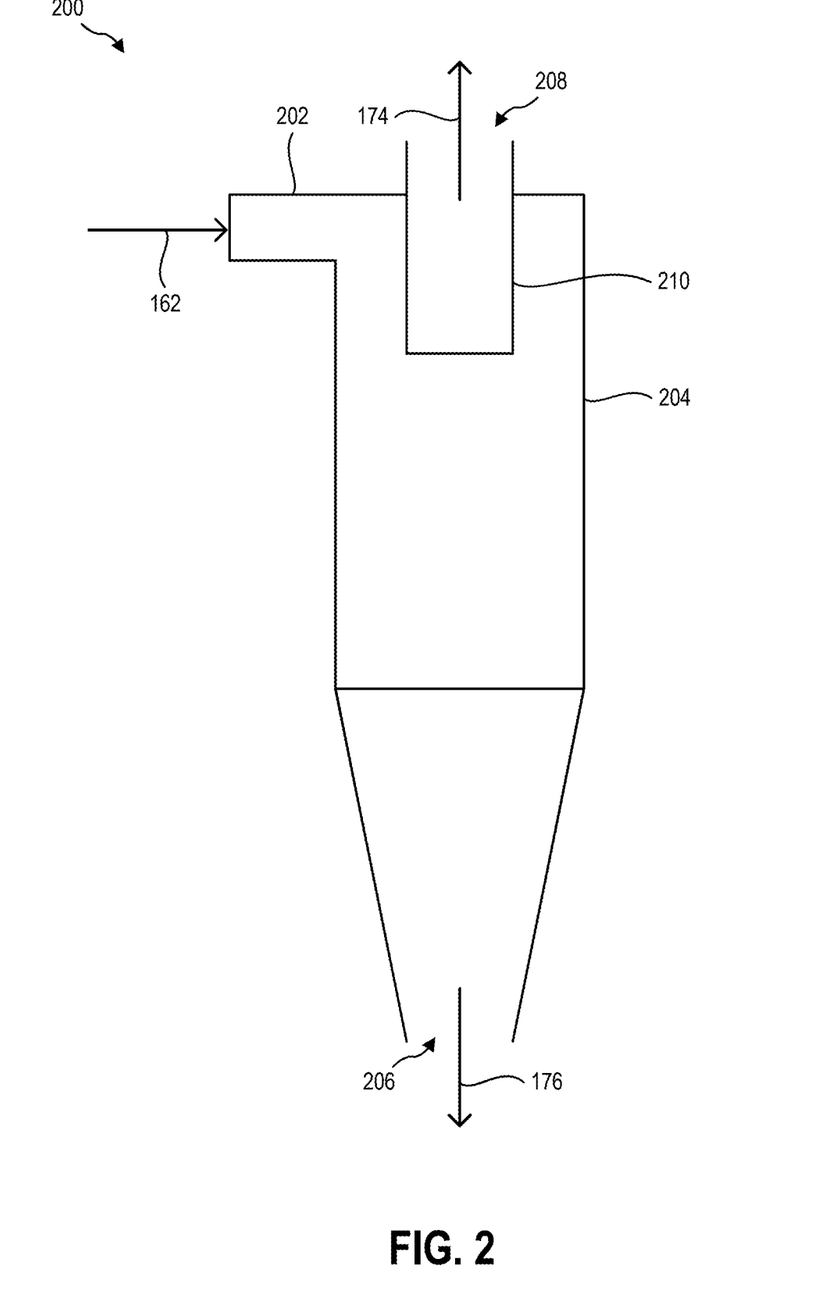
FIG. 2 is a schematic illustrating a cyclone separator, according to at least one embodiment of the disclosure.

As described above, the separator 170 may include a cyclone separator. FIG. 2 is a schematic illustrating a cyclone separator 200 that may replace the separator 170 of FIG. 1, according to at least one embodiment of the disclosure. In some embodiments, the cyclone separator 200 includes a hydrocyclone and may be configured to separate the acid washed solution 162 into the recovered nitrogenous base 174 and the acid wash return 176 based on differences in density between the nitrogenous base and the buffered acid.

The cyclone separator 200 includes an inlet 202 configured to receive the acid washed solution 162 from the acid wash column 152 (FIG. 1). The acid washed solution 162 may be provided to the inlet 202 tangentially at a sufficient pressure to create centrifugal motion in the cyclone separator 200. The centrifugal motion may cause the heavier (denser) phase of the acid washed solution 162 to move to outer walls 204 of the cyclone separator 200 while the lighter (less dense) phase of the acid washed solution 162 moves upwardly through the cyclone separator 200. The heavier phase is discharged at the bottom of the cyclone separator 200 through an underflow outlet 206 and the lighter phase is discharged through an overflow outlet 208 at an upper portion of the cyclone separator 200. The cyclone separator 200 may include a vortex finder 210 at an upper portion thereof to create a rotating spiral movement of the fluid in the center of the cyclone separator 200 to facilitate the removal of the lighter phase in the overflow outlet 208. The recovered nitrogenous base 174 is discharged from the cyclone separator 200 at the overflow outlet 208 and the acid wash return 176 is discharged from the cyclone separator at the underflow outlet 206.

In some embodiments, the cyclone separator 200 is located at a vertically elevated position within the carbon capture system 100 (FIG. 1). For example, the cyclone separator 200 may be located above at least one of the absorber 104 (FIG. 1) or the regenerator 116 (FIG. 1). A relatively elevated position of the cyclone separator 200 may facilitate the flow of the acid washed solution 162 to the cyclone separator 200 by gravity. Of course, in some embodiments, the acid washed solution 162 is pumped to the cyclone separator 200 with the pump 172 (FIG. 1).

Use of the cyclone separator 200 to separate the recovered nitrogenous base 174 from the acid washed solution 162 facilitates the separation without using expensive solvents and without requiring additional separation of an additional solvent from the recovered nitrogenous base 174. In some embodiments, the buffered acid solution 154 and the acid washed solution 162 have a density of at least about 1.05 g/cm$^3$. In some embodiments, a difference in density of the nitrogenous base and the buffered acid may be at least about 0.08 g/cm$^3$ and the cyclone separator 200 may separate the recovered nitrogenous base 174 from the acid washed solution 162 based the difference in density between the recovered nitrogenous base 174 and the acid washed solution 162. By way of non-limiting example, the density of the nitrogenous base may be about 0.96 g/ml. Where the buffered acid solution 154 includes buffered citric acid, the density of the buffered acid solution 154 may be about 1.12 g/ml. By way of comparison, the density of dilute sulfuric acid may be about 1.00 g/ml. The difference in density between the nitrogenous base and the buffered acid solution 154 is substantially larger than the difference in density between the nitrogenous base and sulfuric acid. Accordingly, the nitrogenous base may be more easily separated from the buffered acid solution 154 than from sulfuric acid based on separations based on differences in density, such as gravity separation.

In addition, the cyclone separator 200 may be used to remove heat stable salts (HSS) that form in the carbon capture system 100. For example, HSS may form when sulfur oxides ($SO_x$) that may be present in the $CO_2$-containing gas 102 (FIG. 1) react with the nitrogenous base to form a sulfate salt of the nitrogenous base, such as ammonium sulfate. HSS may also be formed by oxidative degradation of the NAS. By way of non-limiting example, the HSS may be removed from the NAS between cooler 188 and heat exchanger 128. In some embodiments, the HSS may be separated from the loaded absorbent 110 using a cyclone separator, such as the cyclone separator 200, with a filter, or by another means. In some embodiments, the cyclone separator 200 is configured to remove the HSS and other salts from the loaded absorbent 110 to remove the HSS from the carbon capture system 100.

Figure 3:
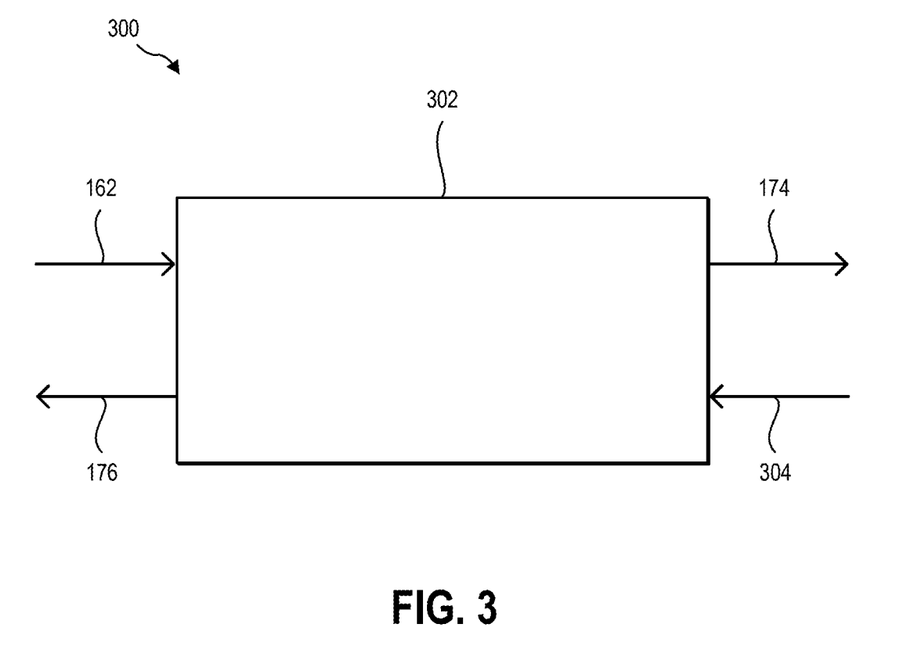
FIG. 3 is a schematic illustrating a solvent extraction separator, according to at least one embodiment of the disclosure.

FIG. 3 is a schematic illustrating a solvent extraction separator 300, according to at least one embodiment of the disclosure. In some embodiments, the separator 170 (FIG. 1) includes the solvent extraction separator 300. The solvent extraction separator 300 may include a vessel 302 configured to receive the acid washed solution 162. A solvent 304 may be flowed countercurrent to the acid washed solution 162 to selectively extract the nitrogenous base from the acid washed solution 162 and form the recovered nitrogenous base 174 and the acid wash return 176. The recovered nitrogenous base 174 may include the nitrogenous base and the solvent 304. The solvent 304 may be selected such that the buffered acid is substantially insoluble in the solvent. In some embodiments, the acid wash return 176 is substantially free of the solvent 304.

The solvent 304 may include a non-aqueous solvent. In some embodiments, the solvent 304 includes an organic solvent. The solvent 304 may include one or more materials already present in the carbon capture system 100. In some embodiments, the solvent 304 includes one or more of the materials described above with reference to the organic diluent of the absorbent. The solvent 304 may include one or more materials present in the absorbent. In some embodiments, the solvent 304 includes one or more polyethylene glycol dialkyl ethers, such as one or more of diethylene glycol dibutyl ether, triethylene glycol dibutyl ether, or tetraethylene glycol dibutyl ether. The one or more polyethylene glycol dialkyl ethers may be present in the absorbent.

The recovered nitrogenous base 174 may be returned to another portion of the carbon capture system 100, such as to the absorber 104 (FIG. 1) or to the regenerator 116 (FIG. 1). The acid wash return 176 may be returned to the acid wash column 152 (FIG. 1).

The carbon capture system 100 may exhibit a $CO_2$ removal capacity of at least about 85 weight percent of the $CO_2$ in the $CO_2$-containing gas 102, such as at least about 90 weight percent, at least about 95 weight percent, at least about 97 weight percent, at least about 98 weight percent, or at least about 99 weight percent of the $CO_2$ in the $CO_2$-containing gas 102. The carbon capture system 100 may be used to remove $CO_2$ from the any $CO_2$-containing material, such as post-combustion streams from fossil fuel or biofuel combustion, natural gas streams, respiration gases from closed environments, or other gases.

The carbon capture system 100 including the buffered acid solution 154 for performing the acid wash and including the separator 170 may facilitate improved operation of the carbon capture system 100 compared to carbon capture systems not including a buffered acid and/or a separator including a cyclone separator or a solvent extraction separator that uses a solvent already present in the carbon capture system. In some embodiments, the buffered acid solution 154 facilitates improved neutralization and capture of the nitrogenous base in the acid washed solution 162. In addition, the buffered acid facilities improved recovery of the nitrogenous base in the acid wash column 152 since the buffered acid has a relatively high concentration of acid and the pH of the buffered acid does not substantially change responsive to exposure to the nitrogenous base. Further, the buffered acid solution 154 may be safer than the use of a strong acid for the acid wash. For example, the buffered acid tank 156 and the make-up acid solution 158 may be provided to the acid wash column 152 at a relatively elevated position. Accordingly, the buffered acid solution 154 is pumped to a relatively high position. Use of the buffered acid solution 154 rather than a strong acid facilitates a safer overall process for the capture of $CO_2$ in the carbon capture system 100.

Use of the cyclone separator 200 or the solvent extraction separator 300 to separate the nitrogenous base from the acid washed solution 162 may reduce the amount of materials used to recover the nitrogenous base from the acid washed solution 162. For example, the cyclone separator 200 may recover the nitrogenous base without using a solvent and based on the difference in density between the buffered acid and the nitrogenous base. In other embodiments, the solvent extraction separator 300 using a solvent that is already present in the NAS and without introducing a foreign material (e.g., solvent) to the carbon capture system 100. Using a solvent already present in the carbon capture system 100 reduces operating expenses of the carbon capture system 100 since the extraction solvent may not be separated from the nitrogenous base.

Figure 4:
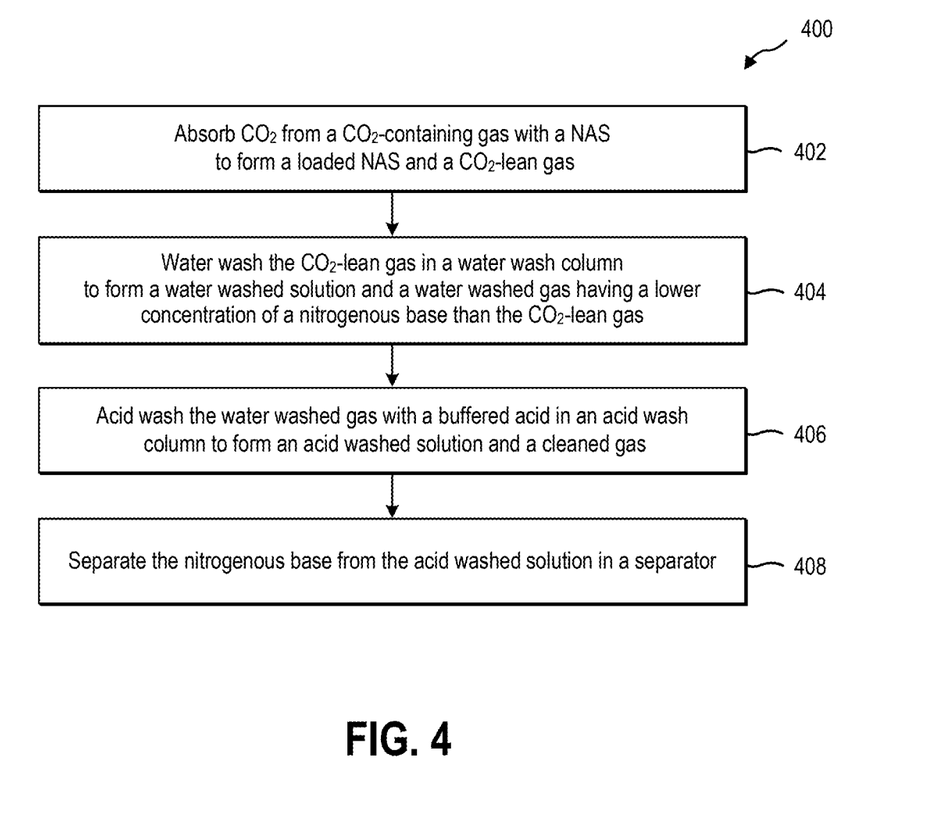
FIG. 4 is a simplified flow diagram illustrating a method of removing carbon dioxide from a $CO_2$-containing stream, according to at least one embodiment of the disclosure.

FIG. 4 is a simplified flow diagram illustrating a method of removing carbon dioxide from a $CO_2$-containing stream, according to at least one embodiment of the disclosure. The method 400 includes absorbing $CO_2$ from a $CO_2$-containing gas with a NAS to form a loaded NAS and a $CO_2$-lean gas, as shown in act 402. In some embodiments, act 402 includes contacting the $CO_2$-containing gas with a NAS in an absorber, as described above with reference to FIG. 1. The NAS may be the same as the NAS described above and may include a nitrogenous base, such as an amine. In some embodiments, the $CO_2$-lean gas includes at least some of the nitrogenous base therein.

Responsive to absorbing $CO_2$ from the $CO_2$-containing gas, the method 400 includes water washing the $CO_2$-lean gas in a water wash column with a water wash to form a water washed solution and a water washed gas having a lower concentration of a nitrogenous base than the $CO_2$-lean gas, as shown in act 404. The water wash column, the washed liquid, and the water washed gas may be the same as described above with reference to FIG. 1. In some embodiments, the water washed gas includes a lower concentration of the nitrogenous base than the $CO_2$-lean gas, but may still include at least some of the nitrogenous base.

The method 400 may further include acid washing the water washed gas with a buffered acid in an acid wash column to form an acid washed solution and a cleaned gas, as shown in act 406. The acid wash column, the acid washed solution, and the cleaned gas may be the same as described above. The clean gas may have a lower concentration of the nitrogenous base than the acid washed gas. The acid washed solution may include the buffered acid and at least a portion of the nitrogenous base captured by the buffered acid in the acid wash column. The buffered acid may include one or more of the buffered acids described above with reference to the buffered acid solution 154 (FIG. 1).

Responsive to acid washing the water washed gas, the method 400 may further include separating the nitrogenous base from the acid washed solution in a separator, as shown in act 408. The separator may be substantially the same as the separator 170 (FIG. 1) and may include a cyclone separator or a solvent extraction separator.

Example

Figure 5:
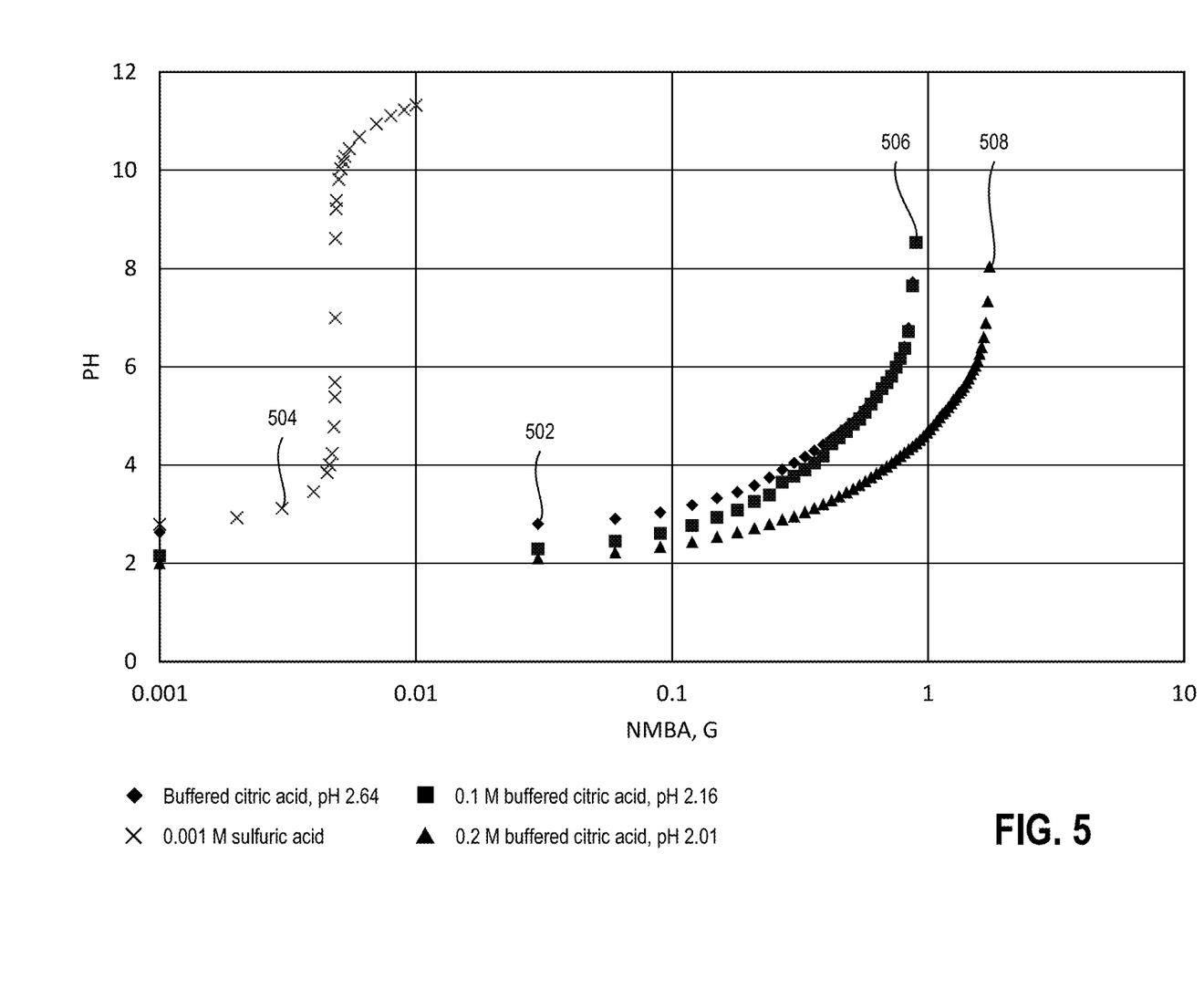
FIG. 5 is a graph illustrating the pH evolution of various acids responsive to exposure to a gas including N-methylbenzylamine.

The ability of various acids in recovering N-methylbenzylamine (NMBA) from a solution was compared using 20 mL of each of the various acids. FIG. 5 is a graph illustrating the pH evolution of each of the acids responsive to exposure to a gas including NMBA and shows the pH of the acids as the acids capture NMBA. Curve 502 was a 0.1 M solution of buffered citric acid having a pH of about 2.64 and was buffered with about 0.37 g citric acid; curve 504 was a 0.001 M solution of sulfuric acid; curve 506 was a 0.1 M solution of buffered citric acid having a pH of about 2.16 and was buffered with about 0.37 g citric acid and less sodium citrate that the solution of curve 502; and curve 508 was a 0.2 M solution of buffered citric acid having a pH of about 2.01 and was buffered with about 0.74 g citric acid.

As seen in FIG. 5, the buffered citric acids of curves 502, 506, and 508 exhibited significantly larger capacity to neutralize the NMBA than the strong acid. The buffered acids of curve 508 having a higher concentration of the buffered citric acid exhibited the highest capacity for neutralizing the NMBA. In addition, relatively small differences in the initial pH of the buffered acids did not substantially affect the capacity of the buffered acids to neutralize the NMBA.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A system for removing carbon dioxide from a carbon dioxide-containing gas, the system comprising:
    an absorber configured to absorb carbon dioxide from the carbon dioxide-containing gas with a non-aqueous solvent to form a carbon dioxide-lean gas, wherein the non-aqueous solvent comprises a nitrogenous base;
    a regenerator configured to remove the carbon dioxide from the non-aqueous solvent after the non-aqueous solvent is loaded with carbon dioxide;
    a water wash column configured to receive the carbon dioxide-lean gas from the absorber and to remove a first portion of the nitrogenous base from the carbon dioxide-lean gas to form a water washed gas;
    an acid wash column configured to facilitate contact between the water washed gas from the water wash column and a buffered acid solution to remove a second portion of the nitrogenous base from the carbon dioxide-lean gas to form an acid washed solution; and
    a separator configured to receive the acid washed solution from the acid wash column and to separate the second portion of the nitrogenous base from the acid washed solution, the separator including:
    a cyclone separator; or
    a solvent extraction separator configured to separate the second portion of the nitrogenous base from the acid washed solution using a solvent present in the non-aqueous solvent.

2. The system of claim 1, wherein the buffered acid solution includes at least one of buffered citric acid or buffered tartaric acid.

3. The system of claim 1, wherein the buffered acid solution includes citric acid and sodium citrate.

4. The system of claim 1, wherein the buffered acid solution has a concentration within a range of from about 1.0 M to about 3.0 M.

5. The system of claim 1, wherein the buffered acid solution has a density greater than about 1.06 g/cm$^3$.

6. The system of claim 1, wherein the buffered acid solution has a density greater than about 1.10 g/cm$^3$.

7. The system of claim 1, wherein the nitrogenous base includes N-methylbenzylamine.

8. The system of claim 1, wherein the non-aqueous solvent further includes an organic diluent including one or more of diethylene glycol dibutyl ether, triethylene glycol dibutyl ether, or tetraethylene glycol dibutyl ether.

9. The system of claim 1, wherein the acid wash column configured to remove a second portion of the nitrogenous base from the water washed gas forms the acid washed solution and a clean gas comprising a lower concentration of the nitrogenous base than the carbon dioxide-lean gas.

10. The system of claim 9, wherein the second portion of the nitrogenous base is returned to the absorber or to the regenerator, and the acid washed solution is returned to the acid wash column.

11. A system for removing carbon dioxide from a carbon dioxide-containing gas, the system comprising:
    an absorber configured to remove carbon dioxide from the carbon dioxide-containing gas with a non-aqueous solvent to form a carbon dioxide-lean gas having a lower concentration of carbon dioxide than the carbon dioxide-containing gas, wherein the non-aqueous solvent comprises a nitrogenous base;
    an acid wash column configured to remove at least some of the nitrogenous base entrained in the carbon dioxide-lean gas with buffered acid solution and form an acid washed solution including the buffered acid solution and the nitrogenous base; and
    a cyclone separator configured to receive the acid washed solution from the acid wash column and separate the nitrogenous base from the acid washed solution.

12. The system of claim 11, wherein the cyclone separator includes a hydrocyclone.

13. The system of claim 11, wherein the acid includes a buffered acid solution.

14. The system of claim 11, wherein the acid includes buffered citric acid.

15. The system of claim 11, wherein the non-aqueous solvent further includes one or more of diethylene glycol dibutyl ether, triethylene glycol dibutyl ether, or tetraethylene glycol dibutyl ether.

16. The system of claim 11, further comprising a water wash column configured to receive the carbon dioxide-lean gas from the absorber and remove a first portion of the nitrogenous base entrained in the carbon dioxide-lean gas and form a water washed gas having a lower concentration of the nitrogenous base than the carbon dioxide-lean gas, wherein the acid wash column is configured to remove a second portion of the nitrogenous base from the water washed gas.

* * * * *